Dec. 5, 1967  A. E. LOSEY  3,355,822

ASTROLOGIC DEVICE

Filed Oct. 23, 1965

INVENTOR.
ALBA E. LOSEY
BY
ATTORNEY 3,355,822
ASTROLOGIC DEVICE
Alba Elinor Losey, 873 N. Chester Ave.,
Pasadena, Calif. 91104
Filed Oct. 23, 1965, Ser. No. 503,428
2 Claims. (Cl. 35—44)

This invention relates to educational and computer devices and more particularly to an astrologic device for facilitating the accurate and rapid location of interrelated intelligence associated with the Zodiac, the celestial mansions, the degrees of the Sun signs and related information.

The invention device, in addition to its usefulness to facilitate the expeditious location of very large quantities of intelligence accumulated over the years by students of astrology, has very substantial value in the random selection of interrelated intelligence pertaining to the Zodiac, the twelve signs of the Sun, the nine related planets, and the twelve houses of the celestial mansions. By means of the simple and easily operated device of this invention, intelligence of this nature is quickly identified so that it may be segregated from the great mass of astrologic intelligence and availed of for the information, use and, at times, amusement of both small and large groups of persons.

According to a preferred embodiment, the invention comprises a plaque of suitable size bearing on its face a ring scale divided into twelve sectors each subdivided into 30 degrees each representing a day of the calendar year. Superimposed on or disposed concentrically of this plaque is a rotary disc likewise divided into twelve sectors, each marked with a different one of the Zodiac signs. Desirably each sector of this disc is marked with the name of that Zodiac sign and with the period of the calendar controlled by that sign.

A spinner device here represented by an equilateral triangle of transparent material is mounted about the axis of the astrologic device with its apices terminating opposite the degrees of the ring scale and each representing a different time period, typically, the past, the present and the future. A second rotary disc of smaller diameter than the first mentioned disc is mounted for rotation in opposition to friction retainer means serving to hold the disc in position. This disc is likewse divded into twelve sectors appropriately marked with intelligence associated with each of the twelve celestial mansions.

The two rotary discs can be manually set as will be described below in accordance with certain control factors related to the facts concerning which astrologic information is desired. The spinner can be rotated in the appropriate direction. After stopping, the spinner is read, as will be described, to provide the key to an appropriate one of twelve plaques, or the like, in each of three sets thereof and containing correlated astrologic intelligence.

Accordingly, it is a primary object of the present invention to provide a simple, easily-operated device useful in quickly indicating the location of keyed astrologic intelligence.

Another object of the invention is the provision of a device useful in the random location of astrologic intelligence keyed to control data associated with the past, the present and future.

These and other more specific objects will appear upon reading the following specification and claims and upon considering in connection therewith the attached drawing to which they relate.

Referring now to the drawing in which a preferred embodiment of the invention is illustrated.

Figure 1:
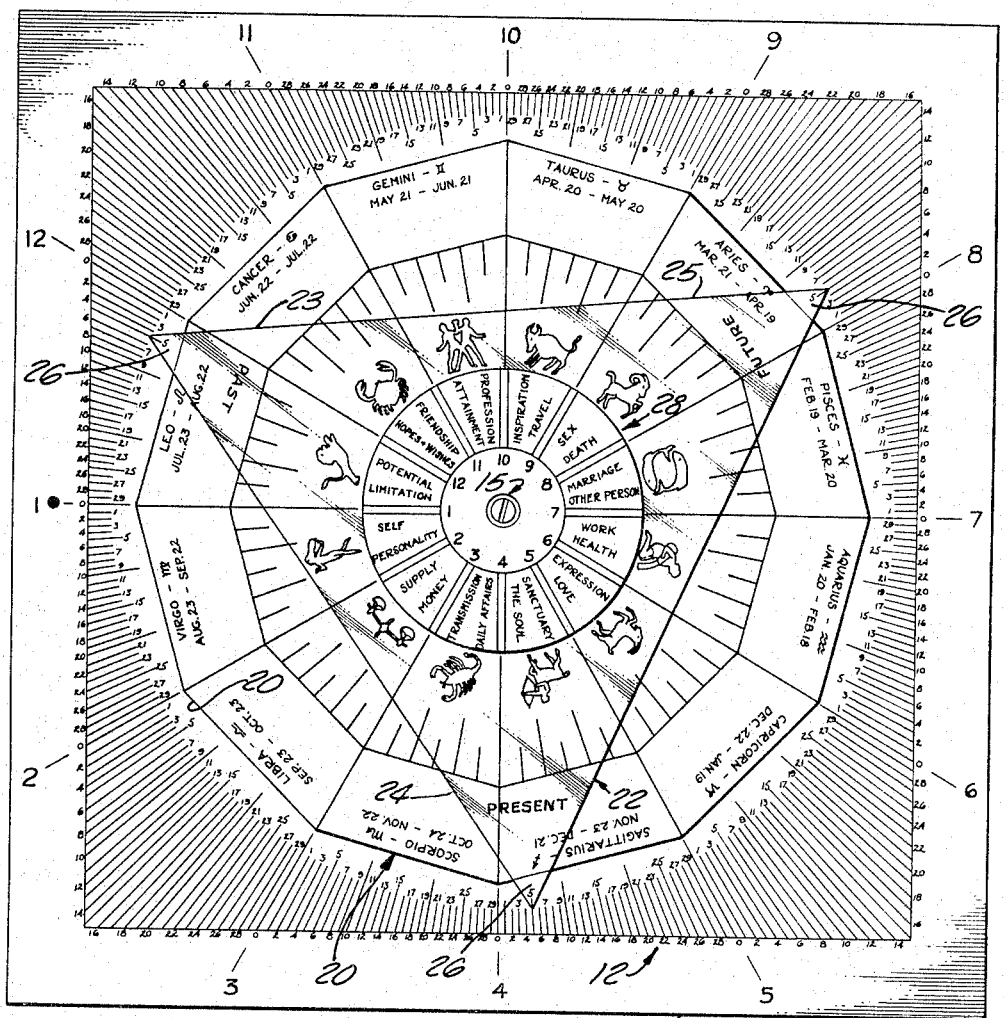
FIGURE 1 is a top plan view of one preferred and illustrative embodiment of the present invention.

Referring initially more particularly to FIGURE 1, there is shown a typical embodiment of an astrologic device designated generally 10 and useful in practicing the present invention. As here shown by way of example, device 10 includes a large rigid plaque 11 of any suitable material imprinted or otherwise provided with a scale ring 12 subdivided into twelve major divisions identified in order by the numerals 1 to 12 in the margin and arranged in counterclockwise order beginning with the 9 o'clock position. Each of these twelve sectors is subdivided into the 30 degrees of the Sun signs, the degrees of each sector being appropriately numbered in counterclockwise order. For convenience in reading it will be observed that the odd degree designators are arranged along the inner rim of scale 12 whereas the even degree designators are arranged along the outer rim of the scale.

Figure 2:
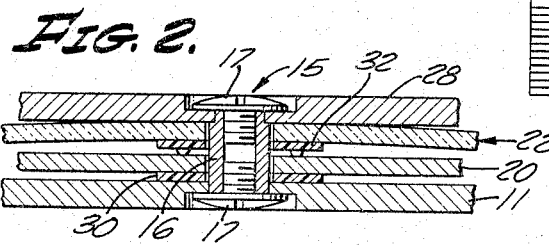
FIGURE 2 is a fragmentary sectional view on an enlarged scale taken through the pivot and friction clutch assembly of the device.

The center of plaque 11 is provided with a combined pivot and restrainer assembly designated generally 15 and shown in enlarged detail in FIGURE 2. Assembly 15, as here shown, includes an internally threaded sleeve 16 in each end of which is mounted a broad-headed cap screw 17. Further details of this pivot and clutch assembly will be described following a description of the several rotary components mounted thereon.

Rotatably supported on assembly 15 and closely overlying the upper surface of plaque 11 is a disc 20 divided into twelve equal radial sectors. Each sector of disc 20 is appropriately marked with the symbol of the associated Sun sign. Each sector is also preferably identified with the name of that Sun sign, as well as with the period of the year controlled thereby.

Overlying disc 20 is a spinner 22 having three equidistantly spaced outwardly directed pointers or indicators 23, 24 and 25 and respectively designating the past, the present and the future. The tip end 26 of each such indicator is preferably turned downwardly so as to closely overlie the graduations on ring scale 12 thereby facilitating the accurate reading of this scale.

Superimposed on spinner 22 is a third rotary disc 28 likewise subdivided into twelve radial sectors here shown as identified by the numbers 1 to 12 arranged in counterclockwise order near the hub of the disc. This disc is likewise divided into twelve radial sectors representing the twelve celestial mansions and labeled with the dominant aspects of life associated with each celestial mansion.

The various components described above are all held assembled by the shaft and clutch assembly 15. Lower disc 20 is separated from plaque 11 by a soft washer 30 providing a frictional drag on disc 20. It will be understood this disc is easily rotated by pressing the finger against its rim edge near scale ring 12 and rotating it to a desired position. The drag effect provided by washer 30 then holds this disc stationary in any desired adjusted position. In the space separating disc 20 and spinner 22 from one another, there is a highly polished low-friction washer 32 having only light frictional drag on the spinner. Additionally, it will be understood the spinner is preferably formed of highly polished transparent plastic or the like. Upper disc 28 carrying the celestial mansion data can be frictionally retained against unintended rotation by proper adjustment of upper cap screw 17 to press disc 28 lightly against the shoulder at the upper end of sleeve 16. Each of the screws 17 has a snug frictional fit with the threads of sleeve 16 with the result that these screws can be finely adjusted to impose the appropriate frictional drag on the several rotary members.

Figure 3:
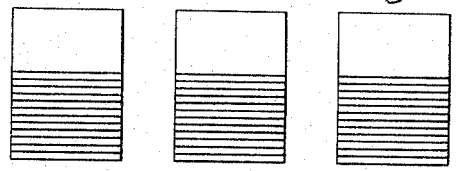
FIGURE 3 is a diagrammatic illustration of sets of plaques bearing different categories of astrologic intelligence.
Figure 4:
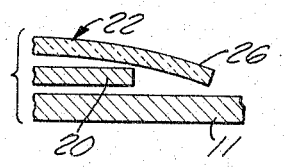
FIGURE 4 is a fragmentary sectional view of the device taken through one of the apices of the spinner device.

Referring now to FIGURE 3, it is pointed out that there shown are three sets of plaques designated A, B and C. Each set contains twelve plaques containing intelligence associated with a different one of the Sun or Zodiac signs, or with the nine ruling planets, or predictions and answer information associated with each Sun sign. Alternatively, the information provided on the three sets of plaques may be printed in book form and arranged appropriately for maximum convenience in locating the information identified during each operation of scales and rotary indicator as herein described.

In operation, let it be assumed that the operator of the device is requested to give information to a person whose birth date is August 25th. The operator first adjusts the lower and larger disc 20 until the Sun sign for Virgo, controlling the destiny of a person having this birth date, is positioned radially opposite the No. 1 sector of ring scale 12, that is, in the sector between the 8 and 9 o'clock position. This position of Virgo is that illustrated in FIGURE 1. The operator then selects the Virgo plaque in set A which informs the operator that the planet Mercury rules the subject and outlines much pertinent information respecting the person born in this period as, for example, the work and vocation preferably followed by such persons, key words controlling his life, flowers, scents, gems and key colors best suited for such persons, etc. The Virgo plaque from set B is then selected and its contents read to the subject respecting matters of intellect, mental, spiritual matters, energy, and personality factors, etc. This plaque also provides information respecting the dominant characteristics of persons born on August 25th under the sign of Virgo and, along with all other intelligence associated with device 10 and sets A, B and C of the plaques, based on centuries-old principles and knowledge pertaining to the art of astrology.

If the subject desires prediction information respecting any subject associated with the past, the present or the future, he first designates which of these time periods is of interest to him. The selected apex, as 23 for example, of the mystic triangle indicator 22 is then positioned directly opposite the "zero" or 9 o'clock reading in the left-hand midportion of scale ring 12. The operator then asks the subject to concentrate on the subject of interest before spinning indicator 22 counterclockwise if the question relates to the past, and clockwise if the question relates to the present or the future. Let it be assumed that apex 23 stops at a degree reading of 5 opposite Sun sign Leo. This represents the randomly selected date in the past and the associated Sun sign controlling the question concerning which information is sought. Thus it will be recognized that the apices of the triangular spinner, always falling opposite the degrees each of which are 120 degrees apart, provides a constant in the evaluation of astrological intelligence derived from any degree in any of the twelve "degree areas" comprised of 30 degrees each, or an equivalent of four complete "degree areas" or signs. This is to say that three equidistant points are at all times related to the three corresponding states of time, "Past," "Present" and "Future." The operator now selects the Leo plaque from set C and reads the intelligence thereon to the subject as well as the intelligence associated with the degree reading "5" selected by apex 23 of the mystic triangle 22. From the foregoing and from a consideration of the showing in FIGURE 1, it will be recognized that the three pointers of indicator 22 are accurately and precisely coordinated with the data and scales operatively associated with these pointers irrespective of the position in which this indicator may stop.

Now let it be assumed that the subject asks a question concerning any subject, as for example, "money." The appropriate celestial mansion dealing with "money" matters is located and the celestial mansion disc is rotated until celestial mansion 2 overlies the first sector of scale ring 12, or the space between 8 and 9 o'clock. If the question being asked by the subject relates to the future, then "future" apex 25 of the spinner is brought into alignment with the "zero" reading of the first Sun sign and the subject is requested to spin the mystical triangle counterclockwise.

When the triangle stops, the future apex is read on the degree scale 12. If the degree reading is odd, the answer is yes. If the degree reading is even, the answer is no. If the degree reading is between a pair of adjacent degree graduations, the answer is maybe. If the reading is "zero," the question is not a valid one and should be reconsidered and the subject may spin again. Under the assumed condition the future apex 25 stops at a reading of 5 opposite the celestial mansion designated "sex" and "death," the subject is advised that the answer to his question involves these two personal factors associated with the question under consideration.

It is to be understood that the intelligence contained on each of the sets of plaques A, B and C is selected from appropriate astrological information accumulated over many years and is well known in various depositories and to persons skilled in the art of astrology. The present device merely provides a convenient easily-operated mechanical means for quickly and systematically gaining access to appropriate portions of this vast collection of astrological information. In addition, the present device provides a useful instrument for use in making random predictions and providing meaningful answers to properly framed questions answerable by yes, no and maybe.

While the particular astrologic device herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. An astrologic device for use in the rapid and accurate location of interrelated data associated with the Zodiac, the celestial mansions and degrees of the Sun signs, said device comprising a rigid main body plaque having a ring scale consisting of the twelve Sun signs each similarly and equally divided into the degrees of the Sun sign, a transparent spinner, first and second rotary discs disposed closely adjacent the opposite sides of said spinner, common spindle means passing through the centers of said spinner and said first and second discs and through said plaque centrally of said ring scale, said common spindle means including means for weakly holding each of said first and second discs in their respective adjusted positions until forcibly rotated to a different position relative to one another and including means permitting said spinner to spin rapidly and freely without disturbing the position of either of said first or second discs, said first disc being substantially larger in diameter than said second disc and being positioned adjacent said plaque with its periphery inwardly of and close to said ring scale, said first disc being divided into twelve equal radial sectors each marked to represent one of the Zodiac signs, said second disc overlying said spinner and divided into twelve radial sectors each marked to represent a different celestial mansion, said spinner comprising an equilateral triangle having its three radially disposed pointed apices terminating opposite said ring scale and cooperating therewith when stationary to designate the same degree position relative to a respective one of said Sun signs, said pointed apices being marked distinctively and differently and respectively representing the past, the present and the future.

2. An astrologic device as defined in claim 1 characterized in the provision of means containing a plurality of sets of readings, each of said sets having pertinent intelligence thereon, one of said sets of readings being keyed to a respective one of the twelve Sun signs, another set being keyed to a respective one of the twelve ruling planets and the third set being keyed to a respective one of the different degrees of each Sun sign.

References Cited
UNITED STATES PATENTS

| | | | |
|---|---|---|---|
| 1,095,227 | 5/1914 | Phillips | 273—161 |
| 1,171,458 | 2/1916 | Phillips | 35—44 |
| 1,502,761 | 7/1924 | Bart | 35—44 |
| 2,219,378 | 10/1940 | Booth | 35—44 |
| 2,315,316 | 3/1943 | Cissna | 35—44 |
| 2,518,664 | 8/1950 | Chern | 35—44 |

JEROME SCHNALL, *Primary Examiner.*